United States Patent [19]

Lemieux

[11] Patent Number: 4,833,946

[45] Date of Patent: May 30, 1989

[54] VARIABLE FORCE SOLENOID PRESSURE CONTROL FOR AN AUTOMATIC TRANSMISSION

[75] Inventor: George E. Lemieux, Livonia, Mich.

[73] Assignee: Ford Motor Company, Dearborn, Mich.

[21] Appl. No.: 121,383

[22] Filed: Nov. 16, 1987

[51] Int. Cl.⁴ ............................................. B60K 41/06
[52] U.S. Cl. ........................................ 74/868; 74/866
[58] Field of Search ................................... 74/865–869

[56] References Cited

U.S. PATENT DOCUMENTS

| | | |
|---|---|---|
| 3,080,768 | 3/1963 | Jania ........................................ 74/869 |
| 3,727,487 | 4/1973 | Förster et al. ......................... 74/865 |
| 3,750,495 | 8/1973 | Ito et al. ................................. 74/866 |
| 3,783,713 | 1/1974 | Will ........................................ 74/865 |
| 3,859,873 | 1/1975 | Miyauchi et al. ...................... 74/867 |
| 3,918,312 | 11/1975 | Espenschied et al. ............ 74/867 X |
| 4,283,970 | 8/1981 | Vukovich ............................ 74/866 |
| 4,293,002 | 10/1981 | Moriyama et al. ............. 137/625.64 |
| 4,351,206 | 9/1982 | Lemieuv et al. ....................... 74/866 |
| 4,388,844 | 6/1983 | Arai et al. ......................... 74/867 X |

Primary Examiner—Dwight G. Diehl
Attorney, Agent, or Firm—Donald J. Harrington; Keith L. Zerschling

[57] ABSTRACT

A control valve circuit for an automatic transmission having a variable force solenoid valve that is supplied with feed pressure by a variable force solenoid pressure relief valve to produce a signal that acts on a main regulator valve thereby avoiding high pressure forces on said variable force solenoid valve.

4 Claims, 2 Drawing Sheets

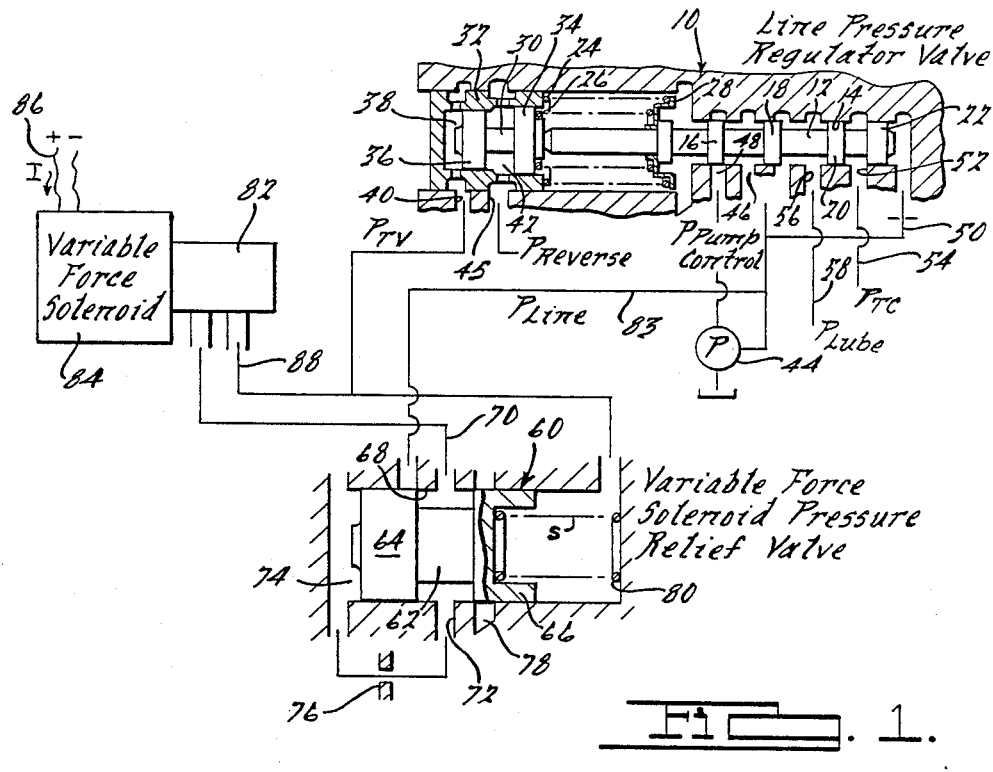
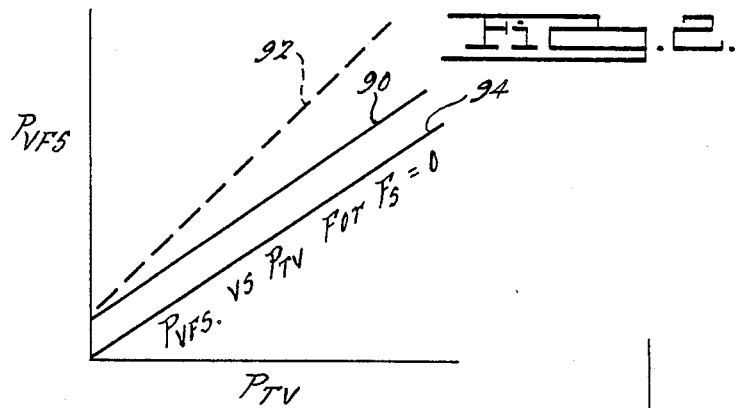
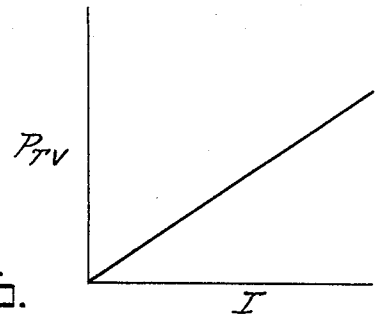

VARIABLE FORCE SOLENOID PRESSURE CONTROL FOR AN AUTOMATIC TRANSMISSION

BACKGROUND OF THE INVENTION

My invention comprises improvements in an electronically controlled pressure regulator for use in an automatic transmission control circuit. A typical automatic transmission that may incorporate the improvements of my invention may be seen by referring to U.S. Pat. No. 4,351,206, which is assigned to the assignee of this invention. That patent describes a multiple ratio planetary transmission mechanism having clutches and brakes for controlling the relative motion of planetary gear elements to establish multiple forward driving ratios and a single reverse ratio. It discloses also an engine driven pump which is used to supply control pressure for an automatic control circuit. The circuit includes fluid pressure operated clutch servos and fluid pressure operated brake servos which are selectively controlled by the control valve circuit. Pressure is regulated in the control valve circuit by a pressure regulator valve that receives pressure signals that are proportional in magnitude to vehicle speed as well as to engine torque to establish a variable circuit pressure, the magnitude of which is controlled to provide the maximum pressure necessary to maintain the desired torque capacity of the clutches and brakes under varying driving conditions.

The regulator valve described in U.S. Pat. No. 4,351,206 is actuated by a control solenoid. The solenoid establishes a valve actuating force and the magnitude of the force of the solenoid depends upon a voltage signal that is proportional to engine torque. Engine torque is measured by the vehicle engine throttle position. An appropriate displacement-to-voltage transducer is provided for this purpose.

The regulator valve of U.S. Pat. No. 4,351,206 receives pressure directly from the control pump that is driven by the engine. Thus the valve is subjected to relatively high pressures.

Another example of a related control circuit is described in U.S. Pat. No. 3,727,487. That circuit includes a pressure regulator valve for an automatic transmission wherein the valve is subjected to a pilot pressure developed by a pilot valve that is under the control of a variable orifice solenoid. The solenoid is actuated by an engine torque signal. The engine torque signal is developed by a transmitter that responds to vehicle engine accelerator position. That signal is amplified and distributed to the variable force solenoid. The output pressure of the pilot valve is distributed to the main regulator valve. The pilot valve also is subjected to the pressure made available to the main regulator valve. Both the main regulator valve and the pilot valve are supplied with pressure by the engine driven pump.

U.S. Pat. No. 4,293,002 shows still another example of a valve circuit that includes a variable force solenoid to develop an optimum circuit pressure in an automatic transmission control. That patent describes a pilot valve that receives pressure through passages that are subjected to line pressure, and in this respect the teachings of U.S. Pat. No. 4,293,002 are similar to the teachings of U.S. Pat. No. 3,727,487 described above.

The solenoid efforts in these prior art circuits are undesirably high because they are subjected to full line pressure. Also, these prior art circuits require a constant supply pressure and the pressure drop that must be developed because of this is a variable pressure drop at all levels of pressure output. This is not conducive to an accurate, predictable relationship between pressure and current.

BRIEF DESCRIPTION OF THE INVENTION

Unlike the prior art teachings, the circuit of my invention uses a non-flow regulating valve means for establishing a pilot pressure that is distributed to a variable force solenoid, the latter in turn developing a pressure that can be used by a regulator valve in an automatic control valve system. The solenoid valve is provided with a variable pressure that is varied just as the solenoid itself varys pressure so that the solenoid valve will handle a constant pressure drop at all levels rather than an increasing pressure drop as in the prior art systems as the torque level increases. As a result of this variable pilot pressure, the pressure versus current relationship of the variable force solenoid is improved. Pressure variations for the variable force solenoid thus are minimized as the variable force solenoid develops a pressure that is proportional to the output pressure of the solenoid plus a fixed pressure.

BRIEF DESCRIPTION OF THE FIGURES OF THE DRAWINGS

FIG. 1 shows in schematic form a valve circuit employing a variable force solenoid pressure relief valve and a variable force solenoid valve in accordance with the teachings of my invention.

FIG. 2 is a performance graph showing the relationship between the variable force solenoid pressure and the throttle valve pressure made available to a main regulator valve.

FIG. 3 shows the relationship between the throttle valve and the current made available to the variable force solenoid.

PARTICULAR DESCRIPTION OF THE INVENTION

Figure 4:
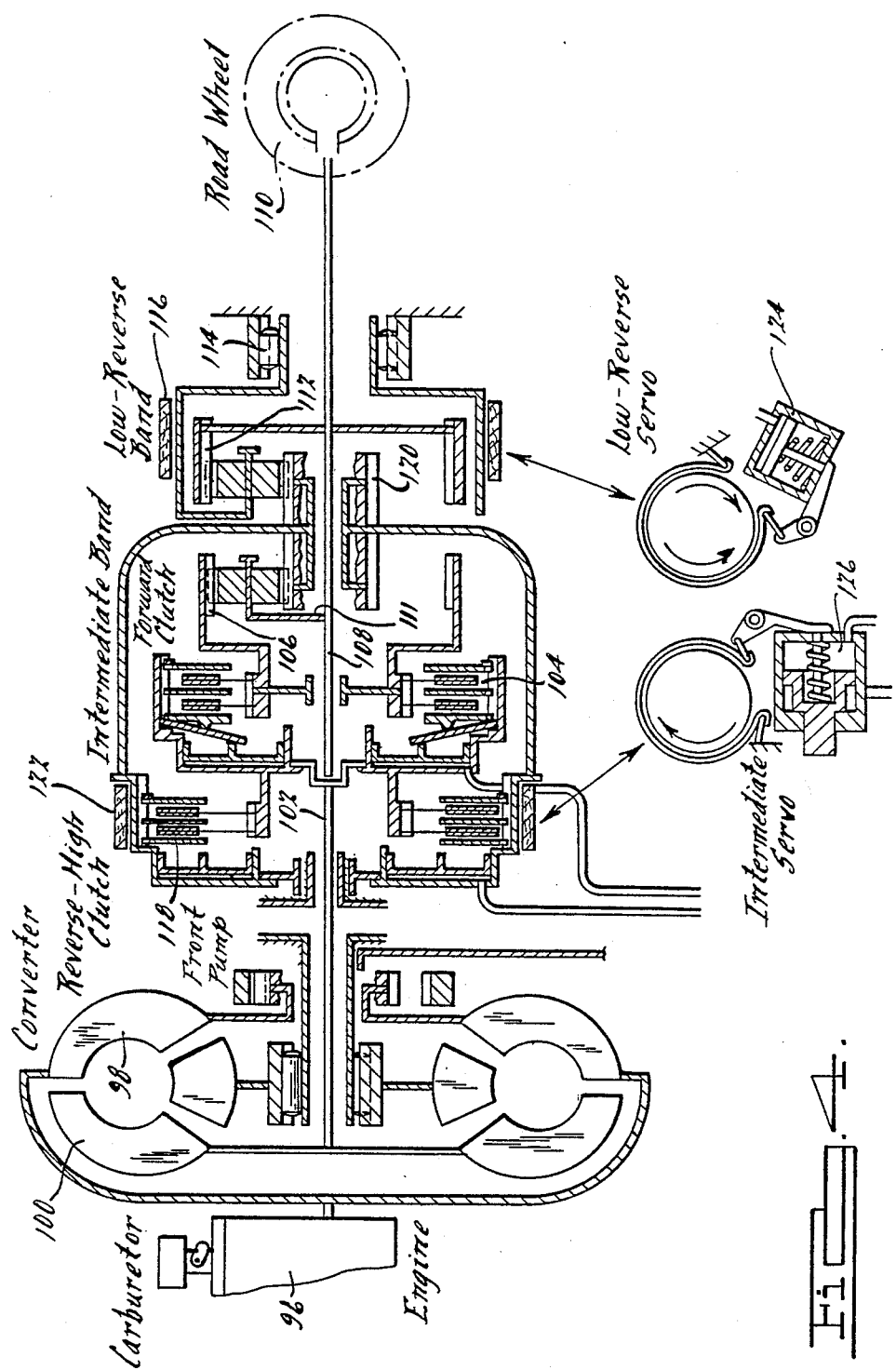
FIG. 4 is a schematic representation of the planetary gearing of an automatic transmission having clutches and brakes that form a part of a circuit of which the valve circuit of FIG. 1 is a part.

In FIG. 1 reference character 10 designates generally a line pressure regulating valve. It includes a multiple land valve spool 12 slidably positioned in a valve bore 14, the latter being formed with internal lands that register with valve spool lands 16, 18, 20 and 22.

Valve spool 12 is urged in a right hand direction as seen in FIG. 1 by valve springs 24 and 26 which are seated on a spring seat 28 secured to the valve spool 12.

At the left hand end of the regulator valve assembly I have provided booster valve spool 30 situated slidably within the valve sleeve 32, which is secured in the valve housing for the regulator valve 10. Spring 24 engages the sleeve 32 which is stationary. Spring 26 engages the valve spool 30 on the right hand side of land 34.

Spool 30 includes also land 36 which cooperates with the sleeve 32 to define pressure cavity 38 which communicates with throttle valve pressure port 40. Thus when chamber 38 is subjected to throttle valve pressure, a force is distributed through the spring 26 to the spool 12.

The valve actuating force can be augmented during reverse drive by subjecting valve chamber 42 to a reverse line pressure, which is distributed to the booster valve assembly through reverse pressure port 45. The diameter of land 34 is larger than the diameter of land 36 so the pressure in valve chamber 42 establishes a force acting in a right hand direction on the valve spool 12 through valve spring 26 which supplements the force developed by the pressure in chamber 38.

An engine driven pump 44 supplies pump pressure to high pressure port 46 intermediate lands 16 and 18. Land 16 controls the degree of communication between port 46 and port 48 which extends to the pump displacement control for the pump 44. Pump 44 is a variable displacement pump of the kind that is described in U.S. Pat. No. 4,665,770, which is assigned to the assignee of my invention. Pressure feedback to the right hand side of the land 22 is provided by feedback passage 50. Port 52 communicates with torque converter feed passage 54 and port 56 communicates with lubrication pressure passage 58. Reference may be made to U.S. Pat. No. 4,665,770 for a more complete understanding of the function of the port 56 and passage 54 since corresponding passages are provided in the valve circuit described in that patent.

A variable force solenoid pressure relief valve is identified generally by reference character 60. It includes a valve spool 62 having two spaced valve lands 64 and 66. Valve spool 62 is slidably positioned in valve chamber 68. Variable force solenoid pressure passage 70 communicates with port 72 located between lands 64 and 66. Port 72 communicates also with the pressure chamber 74 located on the left hand side of land 64. That communication is established by a damping orifice 76.

An exhaust port 78 is located in the valve chamber 68 directly adjacent land 66. Valve spool 62 is urged in a left hand direction, as viewed in FIG. 1, by valve spring 80. Thus the force that is made available to passage 70 is determined by the calibration of the valve spool 62 and the magnitude of the spring rate. The calibration is dependent upon the relative areas of the valve lands. These valve lands may be of unequal area although I have shown them to be equal in area in the schematic diagram of FIG. 1.

The variable force solenoid pressure relief valve establishes in line 70 a pressure that is made available to the variable force solenoid valve 82. That pressure is lower than the pressure in passage, 83, which is a regulated outlet pressure of the pump 44. The variable force solenoid valve 82 is shown in diagrammatic block form in FIG. 1 although it may be a regulator type valve similar to that shown in FIG. 1 at 60.

The variable force solenoid identified by reference character 84 includes an armature that acts on the regulating valve 82. The variable force solenoid is supplied with a signal voltage through leads 86. A suitable accelerator pedal motion-to-voltage transducer such as that described in U.S. Pat. No. 3,727,487 can be used to develop a voltage in leads 86 thereby creating a throttle pressure on the outlet side of the valve 82. That throttle pressure is distributed through passage 88 to port 40 of the line pressure regulating valve 10.

FIG. 3 shows the relationship between throttle valve pressure and current. As illustrated the relationship may be linear.

The relationship between throttle valve pressure and the variable force solenoid pressure in passage 70 is seen in FIG. 2. If the areas of the lands 64 and 66 are equal, a relationship such as that shown by curve 90 is developed. If the area of land 64 is less than the area of land 66, a curve such as that shown at 92 is developed. A curve of greater slope such as that shown at 92 may be desirable under some conditions to compensate for leakage losses at high pressures.

If the force of the solenoid is zero, a relationship such as that shown at 94 is developed. The relationship shown at 90 and 92 assumes that a threshold solenoid force is available. Thus a fixed pressure is added to the pressures developed in passage 88.

It is apparent that my invention provides a favorable environment for a variable force solenoid which minimizes system pressure variations. A variable feed pressure is made available to the variable force solenoid rather than a constant line pressure or a pressure that is unacceptably high.

A separate valve, namely the variable force solenoid pressure relief valve, is provided which creates a new pressure Proportional to but greater than the solenoid pilot pressure. Both of these pressures are significantly lower than the line pressure that would be made available to the solenoid valve using the prior art designs. The solenoid effort therefore is significantly lower with my improvement. This improves the accuracy of the solenoid valve by minimizing pilot regulation requirements under all operating conditions.

In FIG. 4 I have illustrated in schematic form a typical planetary automatic transmission having clutches and brakes that are operated by servos that form a part of the control circuit of which the circuit of FIG. 1 is a part.

In FIG. 4 numeral 96 shows an internal combustion engine for a vehicle. It is connected directly to the impeller 98 of a hydrokinetic torque converter. Turbine torque is developed in the torque converter, the turbine being shown at 100.

Turbine torque is distributed to turbine shaft 102 and through forward clutch 104 to the ring gear 106 of a front planetary gear unit. Output shaft 108 which is connected to the road wheel 110 is connected to the carrier 111 of the front planetary gear unit and to the ring gear 112 of the rear planetary gear unit. The carrier for the rear planetary gear unit is anchored by overrunning brake 114 under forward driving conditions and by friction brake 116 during low forward drive and reverse drive.

High speed ratio clutch 118 distributes turbine torque from the shaft 102 to the sun gear 120, which is common to both the front planetary gear unit and the rear planetary gear unit. An intermediate speed ratio brake band 122 anchors the sun gear 120 during intermediate speed ratio operation.

During reverse drive clutch 118 is engaged and brake band 116 is engaged so that the forward driving motion of the sun gear 120 is reversed by the rear planetary gear unit, thus driving the shaft 108 in reverse direction.

The servo for operating the low and reverse brake band 116 is shown at 124, and the servo for operating the intermediate brake band is shown at 126.

Having described a preferred embodiment of my invention, what I claim and desire to secure by U.S. Letters Patent is:

1. In a hydraulic pressure control circuit for an automatic transmission having fluid pressure operated clutch and brake servo means for controlling transmission ratio changes;
    a pump and a main pressure regulator valve means for establishing a regulated pressure in said control circuit;

a variable force solenoid valve means for developing a pressure proportional to engine torque including a variable force solenoid connected to pressure regulating portions of said torque proportional pressure;

a torque signal passage connecting said variable force solenoid valve means with said pressure regulator valve means whereby the regulated pressure level maintained by said main regulator valve means is controlled in response to changes in said torque proportional pressure;

and a variable force solenoid pressure relief valve means communicating with said torque signal passage and with said variable force solenoid valve means whereby said variable force solenoid valve means is adapted to regulate and to develop a pressure of reduced value relative to the regulated pressure of said main pressure regulator valve means as it establishes said torque proportional pressure, said solenoid pressure relief valve means comprising a pressure regulating valve spool, a valve chamber receiving said spool, said spool and said valve chamber having registering valve lands, a valve spring on one side of said spool urging said spool in one direction, a first pressure area on said spool being exposed to said torque proportional pressure, a second pressure area on said valve spool exposed to said pressure of reduced value whereby said spring, said pressure of reduced value and said torque proportional pressure establish a balanced force on said spool.

2. In a hydraulic pressure control circuit for an automatic transmission having fluid pressure operated clutch and brake servo means for controlling transmission ratio changes;

a pump and a main pressure regulator valve means for establishing a regulated pressure in said control circuit;

a variable force solenoid valve means for developing a pressure proportional to engine torque including a variable force solenoid connected to pressure regulating portions of said torque proportional pressure;

a torque signal passage connecting said variable force solenoid valve means with said pressure regulator valve means whereby the regulated pressure level maintained by said main regulator valve means is controlled in response to changes in said torque proportional pressure;

and a variable force solenoid pressure relief valve means communicating with said torque signal passage and with said variable force solenoid valve means whereby the said variable force solenoid valve means is adapted to regulate and to develop a pressure of reduced value relative to the regulated pressure of said main pressure regulator valve means as it establishes said torque proportional pressure, said variable force solenoid pressure relief valve means including a valve spool located in a valve chamber, spring means for developing a spring force acting on said valve spool to urge it in one direction, said torque signal passage communicating with said valve chamber to establish a pressure that acts on said spool to supplement the force of said spring means.

3. The combination as set forth in claim 2 wherein said valve spool has two lands, a main regulated pressure port connected to said pump and registering with one land, a solenoid valve passage connecting said variable force solenoid pressure relief valve with said variable force solenoid valve means and communicating with said valve spool to oppose the force of said spring means whereby the said pressure of reduced value made available to said variable force solenoid valve means is proportional to said torque proportional pressure.

4. The combination as set forth in claim 3 wherein the pressures acting on said lands are controlled, one with respect to the other, whereby the relationship of said pressure of reduced valve in said solenoid valve passage to said torque proportional pressure is predetermined.

* * * * *